United States Patent [19]

Fukazawa

[11] Patent Number: 5,346,949
[45] Date of Patent: Sep. 13, 1994

[54] FLUORINE CONTAINING AQUEOUS COMPOSITION HAVING WATER REPELLENT AND OIL REPELLENT PROPERTIES

[75] Inventor: Yuji Fukazawa, Shizuoka, Japan
[73] Assignee: Hoechst Gosei K.K., Tokyo, Japan
[21] Appl. No.: 66,664
[22] Filed: May 25, 1993
[30] Foreign Application Priority Data May 29, 1992 [JP] Japan .................................. 4-180249

[51] Int. Cl.$^5$ .............................................. C08L 27/12
[52] U.S. Cl. .................................... 524/805; 524/544
[58] Field of Search ....................... 524/805, 544, 251; 526/245

[56] References Cited

FOREIGN PATENT DOCUMENTS

| 294648 | 5/1988 | European Pat. Off. . |
| 345552A3 | 5/1989 | European Pat. Off. . |
| 429983A2 | 11/1990 | European Pat. Off. . |
| 2284619 | 9/1975 | France . |
| 59-163481 | 9/1984 | Japan . |
| 63-145482 | 6/1988 | Japan . |
| 5017538 | 1/1993 | Japan . |

*Primary Examiner*—Joseph L. Schofer
*Assistant Examiner*—Jeffrey T. Smith
*Attorney, Agent, or Firm*—Beveridge, DeGrandi Weilacher & Young

[57] ABSTRACT

A feature of the present invention resides in a fluorine containing aqueous composition having water repellent and oil repellent properties comprising:
(A) a fluorine containing copolymer aqueous emulsion which can be obtained by way of radical polymerization of perfluoroalkyl-acrylate monomer, monomer having carboxyl group and monomer having hydroxyl group at a certain ratio; and
(B) cationic water soluble polymer such as polyallylamine salt.

8 Claims, No Drawings

FLUORINE CONTAINING AQUEOUS COMPOSITION HAVING WATER REPELLENT AND OIL REPELLENT PROPERTIES

INTRODUCTION AND BACKGROUND

This invention relates to a fluorine containing composition with water repellent and oil repellent properties having excellent fixation to fabrics while retaining stability of the composition. In particular, the invention relates to a fluorine containing composition with water repellent and oil repellent properties comprising a copolymer aqueous emulsion with fine particle size of a fluorine containing acrylic monomer (hereinafter the term of "acrylic group" is used to mean a monomer having a methacrylic group or an acrylic group) and cationic water soluble polymer compound.

Resins containing fluorine have been used for textile finishing agents, adhesives and paper finishing agent etc. because of their water and oil repellencies and good resistance against heat and chemicals. In particular, specially aqueous emulsion in which fluorine containing copolymers are dispersed in water are attracting attention because of easy handling and freedom from toxic solvents in textile finishing for the purpose of giving water and oil repellent features.

Applicants have previously applied for a patent (Japanese Patent Application No. 3-264266/1991 entitled "Production Method and Composition of Fluorine Containing Acrylic Group Copolymer Aqueous Emulsion."

The above "fluorine containing acrylic group copolymer aqueous emulsion" has provided good water and oil repellencies with its dried film when it was applied in paints or paper coating processes. However, the same water and oil repellencies could not be achieved when the said fluorine containing acrylic group copolymer aqueous emulsion was used in textile finishing process.

Insufficient fixation of the emulsion to the fabrics is considered to be one of the causes of the lower achievement of water and oil repellencies when the said fluorine containing acrylic group copolymer aqueous emulsion had been applied to textile finishing, even though the emulsion shows excellent water and oil repellency properties if a coating layer is formed.

A fluorine containing component with water repellent and oil repellent properties as an improved water and oil repellent agent is disclosed in the Japanese Kokai Patent No. 3-243685/1991 which is the fluorine containing composition with water repellent and oil repellent properties which is an aqueous emulsion of fluorine containing copolymer with Zeta potential of more than +50 mV.

The patent further discloses two methods of making the Zeta potential be more than +50 mV, namely:
"by having the emulsion contain cationic low water soluble surfactant" and
"by selecting a coplymerizable compound which composes the fluorine containing copolymer having cationic side chains."

However, it is worth noting that the cationic surfactant is known to be highly toxic while the introduction of cationic side chains is known to lower the storage stability.

The applicants have studied how to increase the fixing properties of the fluorine containing acrylic group copolymer aqueous emulsion which is disclosed in the Japanese Patent Application No. 3-264266/1991 in order to make the emulsion applicable to a textile finishing agent and to provide water and oil repellencies to the finished textile.

Further, it was found that the cationic surfactant was desirable when it was applied to the fluorine containing acrylic group copolymer aqueous emulsion of this invention.

Through a series of hard detailed study and research activities for a fluorine containing aqueous composition having water and oil repellencies, good fixing capability to textile fiber and good stability, the applicants have discovered that a combined use of a cationic water soluble polymer helps produce a composition which is stable and having remarkably improved fixation to textiles thereby imparting excellent water and oil repellencies.

SUMMARY OF THE INVENTION

A feature of the present invention resides in a fluorine containing aqueous composition having water repellent and oil repellent properties comprising:

(A) a fluorine containing copolymer aqueous emulsion which can be obtained by way of radical polymerization after refining the size of the dispersed particles to under 0.3 microns through an emulsifying process in water using a surfactant of a composition of monomers including:
  (a) 2 to 40 mol % of a perfluoro-alkyl-acrylate monomer with alkyl group having 6 to 12 carbon atoms;
  (b) 0.1 to 15 mol % of an $\alpha,\beta$-ethylenically unsaturated monomer containing carboxyl group which can be copolymerized with monomer (a);
  (c) 0 to 25 mol % of an $\alpha,\beta$-ethylenically unsaturated monomer containing hydroxyl groups which can be copolymerized with the monomers (a) and (b); and
  (d) 97.9 to 45 mol % of an $\alpha,\beta$-ethylenically unsaturated monomer which can be copolymerized with the monomers described in (a), (b) and (c) and which are different than the monomers (a), (b) and (c); and (B) a cationic water soluble polymer compound.

A further feature of the present invention resides in the above described composition in the form of a mixture of the aqueous emulsion (A) and the cationic compound (B).

A still further feature of the invention resides in the fluorine containing aqueous composition with water repellent and oil repellent properties wherein the aqueous compound is in the form of a two-liquid type component comprising the aqueous emulsion (A) and the cationic compound (B).

Preferably the cationic compound (B) is polyallylamine salt.

In carrying out the invention, the solution of the cationic compound (B) is used with 0.5 to 10 parts by weight, based on solids, with 100 parts by weight, based on solids, of (A).

The size of the dispersed particles having been refined to under 0.3 microns by way of ultrasonic homogenizing or high pressure homogenizing process after monomer composition is emulsified in water using surfactant.

Advantageously the perfluoro-alkyl-acrylate monomer with alkyl group having 6 to 12 carbon atoms (a)

above is α,β-perfluro octyl ethyl methacrylate, and the α,β-ethylenically unsaturated monomer containing carboxyl group (b) above is a methacrylic acid.

Typically, the particle size of the fluorine containing acrylic copolymer in the aqueous emulsion (A) above is 0.5 to 0.3 microns.

DESCRIPTION OF INVENTION

Methods for producing the resinous aqueous emulsion (A) containing fluoroalkyl groups, as disclosed in the Japanese Patent Application No. 3-264266/1991 entitled "Fluorine Containing Acrylic Group Copolymer Aqueous Emulsion" as an example which is incorporated herein by references.

As for the cationic water soluble polymer compound (B), there are several types of polymers that can be used, including polyallylamine, polyethyleneimine, polyvinylamine, polyaminoalkyl methacrylate, etc. In particular, polyallylamine salt is preferable. Polyallylamine salt is:

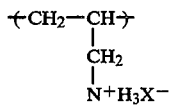

A copolymer having the repeated structural unit corresponding to the formula above, can be obtained by way of radical polymerization of allylamine salt.

The fluorine containing aqueous composition having water and oil repellency of this invention is comprised of the above mentioned (A) component which is a fluorine containing acrylic copolymer emulsion and the above mentioned (B) component which is a cationic water soluble polymer compound.

(A) Examples of perfluoro-alkyl-acrylate monomer having alkyl groups of 6 to 12 carbon atoms suitable for the purposes of this invention include:

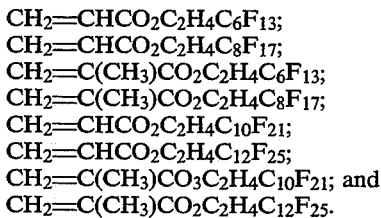

In particular, $CH_2=CHCO_2C_2H_4C_8F_{17}$ (β-perfluorooctyl) ethyl-acrylate) is preferable.

The quantity of the perfluoro-alkyl-acrylate monomer with alkyl group having 6 to 12 carbon atoms is 2 to 40 mol % while 5 to 20 mol % is preferable.

If the quantity is less than 2 mol %, sufficient effect of the perfluoroalkyl group cannot be expected to obtain water repellency.

If the quantity is more than 40 mol %, it becomes difficult to make a pre-emulsion with particles having fine size unless large amounts of fluoro type surfactant are used. Moreover, the emulsion produced therewith was found to have shortcomings including low water resistance as well as a tendency to foam.

As for the α,β-ethylenically unsaturated monomer containing carboxyl group which can be copolymerized with the perfluro-alkyl-acrylate monomer having alkyl groups of 6 to 12 carbon atoms used in this invention, acrylic acid, methacrylic acid, crotonic acid, maleic acid, maleic acid half ester, fumaric acid, fumaric acid half ester, itaconic acid half ester, and the like can be used.

The use of α,β-ethylenically unsaturated monomer containing carboxyl group would not only stabilize the emulsification and copolymerization but also increase the effect of the perfluro-alkyl group resulting in better water repellency.

(B) The quantity of α,β-ethylenic unsaturated monomer containing carboxyl group is in a range of 0.1 to 15 mol % with a preferable range of 2.5 to 10 mol %.

If the quantity is less than 0.1 mol %, the emulsion produced is not sufficient in stability and tends to cause undesirable paint-like reformation, or gellation during storage. Excessive amounts of more than 15 mol % would have accompanying shortcomings of lowering of water resistance of the coating film, and similar problems.

(C) As for the α,β-ethylenically unsaturated monomer with hydroxyl group which can copolymerized with the perfluoro-alkylacrylate monomer having alkyl groups of 6 to 12 carbon atoms mentioned in (A) above and the α,β-ethylenically unsaturated monomer containing carboxyl groups mentioned in (B) above used in this invention, there can be used 2-hydroxyethyl-acrylate, 2-hydroxyethyl-methacrylate, hydroxypropyl-acrylate, hydroxypropyl-methacrylate, 2-hydroxy-3-chloropropyl-acrylate, β-hydroxyethyl-β'-acryloiloxyethyl-phthalate, 1,4-butyleneglycol-monoacrylate, hydroxystyrene, 2-hydroxybutyl-methacrylate, 2-hydroxy-3-phenoxypropyl-acrylate and the like.

As special monomers, tautomeric isomers such as acetoacetoxy-ethylmethacrylate or acetoacetoxyethylacrylate may be used regardless whether it is in Enol form or in Keto form.

The α,β-ethylenically unsaturated monomer having hydroxyl group is not an absolutely required substance, although the use of α,β-ethylenically unsaturated monomer having hydroxyl group is found to be effective in improving water repellency and, in particular, when used with a composition involving cross linking reactive compounds, the hydroxyl group becomes a reactive group for sufficient cross linking reactions.

The quantity of α,β-ethylenically unsaturated monomer with hydroxyl group is 0 to 25 mol % with preferable range of 5 to 15 mol %. Excessive use of more than 25 mol % will result in reduced coating film strength after curing.

As for other α,β-ethylenically unsaturated monomers of this invention than those mentioned above which can be copolymerized with the monomers mentioned in (A), (B) and (C) above:

vinyl esters including vinyl acetate, vinyl butyrate, vinyl proprionate and vinyl esters of α-branched carboxylic acids;

acrylate esters including methyl acrylate, ethyl acrylate, butyl acrylate, 2-ethylhexyl acrylate, n-lauryl acrylate, tridecyl acrylate and n-stearyl acrylate;

methacrylate esters including methyl methacrylate, ethyl methacrylate, butyl methacrylate, 2-ethylhexyl methacrylate, n-lauryl metacrylate, tridecyl methacrylate and n-stearyl methacrylate;

unsaturated acid ester including dibutyl maleate, dibutyl fumarate; or styrene or acrylonitrile may be used.

Further, it is also possible to use functional or crosslinking monomers in place of some of these monomers.

As for the functional or crosslinking monomers, such as acrylamide, N-methylol acrylamide, glycidyl methacrylate, divinyl benzene, trialyl-isocyanurate, tetraalyl-oxyethane may be used.

Fluorine containing divinyl compound such as 1,4-divinyl perfluoro n-butane or 1,6-divinyl perfluoro n-hexane may also be used as a crosslinking agent.

The quantity of the $\alpha,\beta$-ethylenically unsaturated monomers other than mentioned above which can be copolymerized with monomers (A), (B) and (C) is the balance of the total quantity of the monomer after deducting from the quantity of monomers (A), (B) and (C) and is within a range of 97.9 to 45 mol %.

This invention has enabled production of aqueous emulsion and fluorine containing acrylic group copolymers directly with water but without using any solvents.

The quantity of cationic water soluble polymer compound is mainly dependent on the type of such compound used in the production process. In general, it may be 0.5 to 10 parts by weight in equivalent of solids with a preferable range of 1.5 to 5 parts by weight for every 100 parts by weight of fluorine containing acrylic copolymer aqueous emulsion (as solids). Less than 0.5 parts by weight will result in insufficient fixation to textiles and subsequently failure to achieve sufficient water and oil repellencies.

Excessive use of more than 10 parts by weight will lower the stability of water and oil repellent component and also drop the water and oil repellencies because of excess cationic polymer compounds. The cationic polymer compound used as component (B) may be combined in advance with fluorine containing aqueous compositions to make a one-liquid component type product or may be made into a two-liquid component type wherein the two-liquid components are mixed at the time of application.

Furthermore, the components may be separately applied to the textile without mixing to form two-liquid components.

The fluorine containing water and oil repellent aqueous compositions of this invention have good stability and good fixation to textiles and therefore give excellent water and oil repellencies to the textile products.

The applicants consider the reason why the fluorine containing water and oil repellent aqueous compositions of this invention have better fixation to the textile is because of the anchoring effect produced by the cationic polymer compounds. In fact, the applicants have through experiments confirmed that substitutions of the cationic high polymer compound by nonionic water soluble high polymer such as polyvinyl alcohol, polyethylene oxide, polyvinyl-pyrrolidone, methyl cellulose, hydroxyethyl cellulose etc, or by anionic water soluble high polymer such as sodium polyacrylate, carboxylmethl cellulose or sodium alginate could not achieve improvement of fixation to the textiles.

It was also found that, even some cationic compounds such as cationic surfactants, including mono alkyltrimethyl-ammonium-chloride, dialkyl-dimethyl-ammonium-chloride, trialkyl-monomethyl-ammonium-chloride or monoalkyl-dimethylamine could not achieve water and oil repellencies, apart from the previously mentioned toxicity, these did not show any effects although various adjustments were given in the quantities applied.

It was believed by the applicants that the carboxyl content in the fluorine containing acrylic group copolymer aqueous emulsion used in this invention and the anionic content in emulsifier, catalyst for polymerizing or reducing agents react easily with the low molecular cationic surfactant because of its the low molecular weight, while the cationic polymer compound receives less influence of anionic factors of the component due to higher molecular weight.

Further, it was also believed by the applicants that the cationic polymer compound achieves excellent fixation with textile and fluorine containing acrylic group copolymer resin particles thus helping good fixating of the fluorine containing acrylic emulsion to the textile not only by an anchoring effect through neutralization of ionic charges in the molecular but also neutralizing ionic charges which belong to the textile and the resin particles of the fluorine containing acrylic emulsion and in addition by adsorption by van de Waals force as well as by hydrogen bonding.

In particular, polyallylamine salts have excellent miscibility with fluorine containing acrylic aqueous emulsions and a good fixing effect; accordingly, excellent stability of fluorine containing water and oil repellent composition is achieved. Furthermore, textiles which have been treated with the fluorine containing aqueous water and oil repellent composition containing polyallyamine exhibit higher water and oil repellencies than textiles which have been treated with the fluorine containing aqueous water and oil repellent component containing other cationic high polymer compounds.

The fluorine containing aqueous water and oil repellent compositions of this invention may be used with other additives including water repellent agents, such as wax, silicone, zirconium compounds or stearic acid salts, other oil repellent agents, surfactants, insecticides, flame retardants, anti-static additives, softeners, dye fixing agents, anti crease agents to the extent that would not affect fixation to the textile and stability of the composition.

Also, the fluorine containing aqueous water and oil repellent compositions of this invention may be cross-linked by adding melamine resins, blocked isocyanates or epoxy compounds.

The fluorine containing aqueous water and oil repellent compositions of this invention may be applied in various methods according to the subject to be treated, for instance by dipping or by spraying.

The fluorine containing aqueous water and oil repellent compositions of this invention may be powdered by way of spray drying, etc. for reemulsion in water immediately before use.

The fluorine containing aqueous water and oil repellent compositions of this invention are used in the form of treatment liquids with a resin content of 0.5 to 10 weight %.

The subjects to be treated with the fluorine containing aqueous water and oil repellent compositions of this invention are not limited as long as the subjects are textile products. They include natural fibers such as cotton, linen, wool, silk, synthetic fibers such as polyamide group, polyester group, polyurethane group, polyolefine group, polyacrylic group, polyvinyl chloride group, polyvinyl alcohol group; semi synthetics fibers such as rayon or acetate, inorganic fibers such as glass fibers or ceramics fibers, or any combination of those fibers and woven products of these materials.

The present invention will be more specifically explained with the following examples.

Production Example 1

55.2 g (25 mol %) of β-(perfluorooctyl) ethylacrylate (FLUOWET AE800, a trademark of Hoechst, A. G.), 39.4 g (65 mol %) of n-butyl methacrylate (n-BMA), 5 g (9 mol %) of 2-hydroxyethyl-methacrylate (2-HBMA), and 0.36 g (1 mol %) of methacrylic acid (MAA) were weighted out and put into a conical flask to make a homogenized monomer liquid. A solution of surfactant consisting of sodium polyoxyethylene alkylphenyl ether sulfate (2.5 g), disodium hydrogenphosphate 12-$H_2O$ salt (0.5 g) and deionized water (86 g) was added and stirred with a magnetic stirrer to obtain a monomer pre-emulsion with a mean particle size of one micron.

Then the monomer pre-emulsion was subjected to 40 KHz ultrasonic wave using a ultrasonic generator (Honda Electronic Co., W-210R) for 60 minutes while bubbling nitrogen gas through the pre-emulsion. The result was that the mean particle size was reduced to 0.2 microns.

In separate containers, a catalyst solution and a reducer solution were formulated as below:

| Catalyst solution: | Perbutyl H69 (Nippon Oil and Fats Co.) | 1.5 g |
|---|---|---|
| | Polyoxyethylene alkylphenyl ether | 1.5 g |
| | Deionized water | 18.5 g |
| Reducer solution: | Superlite C (Mitsubishi Gas Chemical Co., Ltd.) | 1.0 g |
| | Deionized water | 19.0 g |

After a reactor having a stirrer, a reflux condenser, a dropping funnel, a thermometer and a nitrogen gas pipe were warmed up to 55° C., 20% of the above mentioned monomer pre-emulsion which was subjected to ultrasonic wave radiation was poured into the reactor, and 10% each of the catalyst solution and the reducer solution were added. After 10 minutes, 10% each of the catalyst solution and the reducer solution were further added before the balance of the monomer pre-emulsion was continuously dropped into the reactor with the dropping funnel. Three hours were taken to complete the dropping process. During the above process, the temperature inside the reactor was maintained at 55° to 60° C. and total 60% each of the catalyst solution and the reducer solution were added into the reactor at 15 minutes intervals. After completion of the dropping, the remaining catalyst solution and the reducer solution were added and stirred for one hour before the reaction process was completed.

The fluorine containing acrylic copolymer aqueous emulsion obtained by the above process had 45 weight percent in density and the pH value of 2.5. Using 5% sodium hydroxide solution, the pH value was adjusted to 5.5. The density was also adjusted to 20 weight %.

Preparation of Production Examples 2 and 3

Production examples 2 and 3 were produced with the same process as the production example 1 except for the composition of the monomers was modified as shown in the Table 1 to obtain a containing acrylic copolymer aqueous emulsion.

Preparation of Production Example 4

After monomer pre-emulsion having a composition shown in the Table 1 was obtained under the same method of the production example 1 by stirring with a magnet stirrer, high pressure homogenizing process was given once with the high pressure homogenizer (APV GAULIN, INC. MANTON-GAULIN LABORATORY HOMOGENIZER MODEL 15MR-8TA) applying 8000/psi pressure. By this process, the mean particle size of the monomer pre-emulsion became approximately 0.2 microns. After this process the production method followed to that of production example 1 to obtain a fluorine containing acrylic copolymer aqueous emulsion.

TABLE 1

| | Production Example 1 | Production Example 2 | Production Example 3 | Production Example 4 |
|---|---|---|---|---|
| FLUOWET AE800 (mol %) | 25 | 25 | 25 | 25 |
| n-BMA | 65 | 25 | 65 | 65 |
| 2-EHMA | — | 40 | — | — |
| 2-HEMA | 9 | 9 | 9 | 9 |
| MAA | 1 | 1 | — | 1 |
| AA | — | — | 1 | — |
| Ultrasonic Radiation Homogenizer | ○ | ○ | ○ | |
| High pressure Homogenizer | | | | ○ |

FLUOWET AE-800: β-(perfluorooctyl) ethyl acrylate.
n-BMA: n-butyl methacrylate.
2-EHMA: 2-buthylhexyl methacrylate.
2-HEMA: 2-hydroxyethyl methacrylate.
MAA: Methacrylic Acid.
AA: Acrylic aid.
○: The treatment was conducted.

Embodiment 1

Into 100 parts by weight of the fluorine containing acrylic copolymer aqueous emulsion of a density of 20 weight % which was obtained under the conditions shown in preparation example 1, 5 weight % solution of hydrochloric polyallylamine with a molecular weight of 80,000 was added at 10 parts by weight to produce a fluorine containing acrylic water and oil repellent composition.

The fluorine containing acrylic water and oil repellent composition was then diluted to 400% with deionized water before it was applied to a textile for the water and oil repellent process.

Embodiment 2

Into 100 parts by weight of the fluorine containing acrylic copolymer aqueous emulsion of a density of 20 weight % which was obtained under the conditions shown in preparation example 2, 5 weight % solution of hydrochloric polyallylamine with a molecular weight of 10,000 was added at 10 parts by weight to produce a fluorine containing acrylic water and oil repellent composition. The fluorine containing acrylic water and oil repellent composition was then diluted to 400% with deionized water before it was applied to a textile for the water and oil repellent process.

Embodiment 3

Into 100 parts by weight of a 30 weight % solution of polyethylene imine having a molecular weight of 70,000, 50 parts by weight of hydrochloric acid of 35% density was added for cationization. The so cationized polyethylene imine solution was then diluted with deionized water to 5 weight %. Then into 100 parts by weight of the fluorine containing acrylic copolymer aqueous emulsion of density of 20% obtained by the method described in the preparation example 3, the above mentioned diluted cationized polyethylene imine was added at 8 parts by weight to make a fluorine containing acrylic ester and oil repellent composition. The composition was then diluted to 400% with deionized water, before water and oil repellency application was made on the textile.

Embodiment 4

Into 100 parts by weight of the fluorine containing acrylic copolymer aqueous emulsion of a density of 20 weight % which was obtained under the conditions shown in preparation example 4, a 5 weight % aqueous solution of hydrochloric polyallylamine having a molecular weight of 80,000 was added at 10 parts by weight to produce a fluorine containing acrylic water and oil repellent composition. The fluorine containing acrylic water and oil repellent composition was then diluted to 400% with deionized water before it was applied to a textile for the water and oil repellent process.

Comparative Example 1

The fluorine containing acrylic copolymer aqueous emulsion with a solids content of 20 weight % obtained by the production example 1 was diluted to 400% with deionized water before it was applied onto textile samples in a water and oil repellent process.

Comparative Example 2

Into 100 parts by weight of the fluorine containing acrylic copolymer aqueous emulsion with a density of 20 weight % obtained by preparation example 1, 300% dilution of a 15 weight % solution of anionic polyacrylamide was added at 8 parts by weight to make an aqueous composition. Then it was further diluted to 400% with deionized water before it was applied onto textile samples in a water and oil repellent process.

Comparative Example 3

The fluorine containing acrylic copolymer aqueous emulsion was directly applied without being diluted onto textile samples in a water and oil repellent process.

Methods of Testing

1) Preparation of Samples

Samples were provided according to the following method. Cotton broadcloth pieces and nylon taffeta pieces were dipped into various water and oil repellent agents described in the above mentioned embodiments and comparison examples. The textile pieces were squeezed with a mangle in order to reach a wet pickup value of 80% for cotton and 40% for nylon, respectively. The pieces were then dried for 15 minutes at 80° C. and were given a heat treatment of 150° C. for three minutes.

2) Water Repellency Testing

The samples were tested and evaluated in accordance with the JIS L-1092 Spray method. The relations between the values of the water repellency and conditions are indicated on the Table 2.

TABLE 2

| Value of Water Repellency | Conditions |
|---|---|
| 100 | No water drop on the surface. |
| 90 | Small water drops on the surface without wetting. |
| 80 | Partial wetting in a particle shape on the surface. |
| 70 | Wetting on about a half of the surface with penetrating of small water drops to the back side. |
| 50 | Wetting on almost entire surface. |
| 0 | Penetrating of water to back side. |

3) Oil Repellency Testing

The samplings were tested and evaluated with the degree of permeation of the drops of various solvents indicated in the Table 3 in accordance with the method of AATCC-118-1966. The results are shown in the Table 4.

TABLE 3

| Value of Oil Repellency | Solvent |
|---|---|
| 8 | n-Heptane |
| 7 | n-Octane |
| 6 | n-Decane |
| 5 | n-Dodecane |
| 4 | n-Tetradecane |
| 3 | n-Hexadecane |
| 2 | Mixture of 35 parts of n-hxadecane and 65 parts of liquid paraffin |
| 1 | Liquid paraffin |
| 0 | Lower than 1 |

4) Texture Handling Test

The texture of the samples before application of the water and oil repellent process and after application were compared and observed.

The results of the observation are shown in the Table 4.

TABLE 4

| | EMBODIMENTS | | | | COMPARISON EXAMPLES | | |
|---|---|---|---|---|---|---|---|
| | 1 | 2 | 3 | 4 | 1 | 2 | 3 |
| 20% PRODUCTION EXAMPLE 1 | 100 | | | | 100 | 100 | 100 |
| 20% PRODUCTION EXAMPLE 2 | | 100 | | | | | |
| 20% PRODUCTION EXAMPLE 3 | | | 100 | | | | |
| 20% PRODUCTION EXAMPLE 4 | | | | 100 | | | |
| 5% POLYALLYLAMINE HYDROCHLORIDE SALT | | | | | | | |
| Molecular weight 80,000 | 10 | | | 10 | | | |
| Molecular weight 10,000 | | 10 | | | | | |
| 5% POLYALLYLAMINE IMINE HYDROCHLORIDE SALT, Molecular weight 70,000 | | | 8 | | | | |
| 5% ANIONIC POLYACRYLAMIDE | | | | | | 8 | |
| Density of Treatment Liquid (%) | app. 5 | app. 5 | app. 5 | app. 5 | app. 5 | app. 5 | app. 5 |
| COTTON BROADCLOTH | | | | | | | |

TABLE 4-continued

|  | EMBODIMENTS | | | | COMPARISON EXAMPLES | | |
| --- | --- | --- | --- | --- | --- | --- | --- |
|  | 1 | 2 | 3 | 4 | 1 | 2 | 3 |
| Water Repellency No. | 100 | 100 | 100 | 100 | 0 | 0 | 90 |
| Oil Repellency No. | 6 | 6 | 6 | 6 | 0 | 0 | 4 |
| NYLON TAFFETA | | | | | | | |
| Water Repellency No. | 100 | 100 | 100 | 100 | 90 | 90 | 100 |
| Oil Repellency No. | 7 | 7 | 7 | 7 | 5 | 5 | 7 |
| TEXTURE HANDLING | o | o | o | o | o | o | x | o: No significant change in the texture handling.
x: Significant damages to the texture handling.

The Advantageous effect of the invention is that this invention has excellent water and oil repellency properties, and, furthermore, it has good stability and fixing properties to textiles.

What is claimed is:

1. A fluorine containing aqueous composition having water repellent and oil repellent properties comprising:
   (A) a fluorine containing copolymer aqueous emulsion obtained by radical polymerization after refining the size of the dispersed particles to under 0.3 microns through an emulsifying process in water by adding a surfactant to a composition of monomers comprising:
      (a) 2 to 40 mol % of a perfluoro-alkyl-acrylate monomer wherein the alkyl group has 6 to 12 carbon atoms;
      (b) 0.1 to 15 mol % of an $\alpha,\beta$-ethylenically unsaturated monomer containing carboxyl group which can be copolymerized with monomer (a);
      (c) 0 to 25 mol % of an $\alpha,\beta$-ethylenically unsaturated monomer containing hydroxyl groups which can be copolymerized with the monomers (a) and (b); and
      (d) 97.9 to 45 mol % of $\alpha,\beta$-ethylenically unsaturated monomer which can be copolymerized with the monomers described in (a), (b) and (c) and which is different than monomers (a), (b) and (c); and
   (B) a cationic water soluble polymer compound.

2. The fluorine containing aqueous composition with water repellent and oil repellent properties according to claim 1 which is in the form of a mixture of the aqueous emulsion (A) and the cationic compound (B).

3. The fluorine containing aqueous composition with water repellent and oil repellent properties according to claim 1 wherein the cationic water soluble polymer compound in the cationic compound (B) is polyallylamine salt.

4. The fluorine containing aqueous composition with water repellent and oil repellent properties according to claim 1, wherein a solution of the cationic compound (B) is used with 0.5 to 10 parts by weight, based on solids, with 100 parts by weight, based on solids, of (A).

5. The fluorine containing aqueous composition with water repellent and oil repellent properties according to claim 1, wherein the size of the dispersed particles having refined to under 0.3 microns by way of ultrasonic homogenizing or high pressure homogenizing process after monomer composition is emulsified in water using surfactant.

6. The fluorine containing aqueous composition with water repellent and oil repellent properties according to claim 1 wherein the perfluoro-alkyl-acrylate monomer is $\alpha,\beta$-perfluro octyl ethyl methacrylate.

7. The fluorine containing aqueous composition with water repellent and oil repellent properties according to claim 1 wherein the $\alpha,\beta$-ethylenically unsaturated monomer (b) is methacrylic acid.

8. The fluorine containing product with water repellant and oil repellant properties comprising:
   (A) The fluorine containing copolymer aqueous emulsion obtained by radical polymerization after refining disperse particles to under 0.3 microns through an emulsifying process in water by adding a surfactant to a composition of monomers comprising:
      (a) 2 to 40 mol % of a perfluoro-alkyl-acrylate monomer wherein in the alkyl group has six to twelve carbon atoms;
      (b) 0.1 to 15 mol % of $\alpha,\beta$-ethylenically unsaturated monomer contained carboxyl group which can be copolymerized with monomer (a);
      (c) 0 to 25 mol % of an $\alpha,\beta$-ethylenically unsaturated monomer containing hydroxyl groups which can be copolymerized with the monomers (a) and (b); and
      (d) 97.9 to 45 mol % of an $\alpha,\beta$-ethylenically unsaturated monomer which can be copolymerized with the monomers described in (a), (b), and (c) and which is different than monomers (a), (b) and (c); and
   (B) A cationic water-soluble polymer compound; which is in the form of a two-liquid component product comprising the aqueous emulsion (A) separate from the cationic compound (B).

* * * * *